US007414191B2

(12) United States Patent
Long

(10) Patent No.: US 7,414,191 B2

(45) Date of Patent: Aug. 19, 2008

(54) ELECTRICAL-COMPONENT ASSEMBLY AND METHOD OF ASSEMBLING THE SAME

(75) Inventor: Norman R. Long, Tipp City, OH (US)

(73) Assignee: A. O. Smith Corporation, Milwaukee, WI (US)

( * ) Notice: Subject to any disclaimer, the term of this patent is extended or adjusted under 35 U.S.C. 154(b) by 693 days.

(21) Appl. No.: 10/996,108

(22) Filed: Nov. 23, 2004

(65) Prior Publication Data

US 2006/0124336 A1 Jun. 15, 2006

(51) Int. Cl.
*H02G 3/08* (2006.01)

(52) U.S. Cl. ......................... 174/50; 174/520; 174/559; 439/535; 200/293; 200/297

(58) Field of Classification Search ................... 174/50, 174/520, 53, 58, 57, 541, 542, 559, 560, 174/562; 220/3.2, 3.3, 3.7, 3.8, 4.02; 439/535, 439/536, 76.1, 76.2, 521; 200/297, 293, 200/296, 82 C, 47
See application file for complete search history.

(56) References Cited

U.S. PATENT DOCUMENTS

| | | | | |
|---|---|---|---|---|
| 1,130,475 | A | 3/1915 | Campbell | |
| 1,510,492 | A | 10/1924 | Caron et al. | |
| 1,955,901 | A | 4/1934 | Britsch | |
| 2,124,337 | A | 7/1938 | Popp | |
| 2,165,200 | A | 7/1939 | Batcheller | |
| 2,726,293 | A | 12/1955 | Bramming | |
| 3,041,088 | A | 6/1962 | Brandon, Jr. | |
| 3,687,487 | A | 8/1972 | Lindholm | |
| 4,081,641 | A | 3/1978 | Piber | |
| 4,317,971 | A * | 3/1982 | Roth | 200/82 C |
| 4,766,277 | A | 8/1988 | Bigelow, Jr. | |
| 4,847,453 | A * | 7/1989 | Newell et al. | 200/47 |
| 4,922,069 | A | 5/1990 | Huizenga | |
| 5,382,766 | A * | 1/1995 | Sherman | 200/296 |
| 5,514,006 | A | 5/1996 | Getselis et al. | |
| 6,155,867 | A | 12/2000 | Chou | |
| 6,369,320 | B1 * | 4/2002 | Okamoto | 174/50 |
| 6,636,427 | B2 * | 10/2003 | Dorrie | 174/50 |
| 6,660,952 | B2 | 12/2003 | Hsu | |
| 6,790,049 | B2 * | 9/2004 | Kaylie et al. | 439/76.1 |

* cited by examiner

*Primary Examiner*—Angel R Estrada
(74) *Attorney, Agent, or Firm*—Michael Best & Friedrich LLP

(57) ABSTRACT

An electrical-component assembly that includes a first housing portion that includes a wall. The wall includes a slot. At least a portion of the slot includes threads. An electrical component includes a body and a threaded protrusion. The threaded protrusion defines a longitudinal axis and is translational along a path that includes a portion that is substantially perpendicular to the longitudinal axis to engage with the threaded portion of the slot such that the body inhibits rotation of the electrical component relative to the first housing portion.

20 Claims, 4 Drawing Sheets

ELECTRICAL-COMPONENT ASSEMBLY AND METHOD OF ASSEMBLING THE SAME

BACKGROUND

The invention relates to an electrical-component assembly and a method of assembling the same. More particularly, the invention relates to an assembly and method for attaching a switch to a housing without the use of a conventional fastener.

SUMMARY

In one embodiment, the invention provides an electrical-component assembly that includes a first housing portion that includes a wall. The wall includes a slot. At least a portion of the slot includes threads. An electrical component includes a body and a threaded protrusion. The threaded protrusion defines a longitudinal axis and is translational along a path that includes a portion that is substantially perpendicular to the longitudinal axis to engage with the threaded portion of the slot such that the body inhibits rotation of the electrical component relative to the first housing portion.

In another embodiment, the invention provides an electrical-component assembly that includes a first housing portion including a wall. The wall includes a threaded slot that has an open end. A second housing portion is engaged with the first housing portion to define a housing interior. The second housing portion covers the open end and a switch is disposed substantially within the housing interior and includes a body and a threaded protrusion. The threaded protrusion translationally engages with the threaded slot such that the body inhibits rotation of the switch relative to the first housing portion.

The invention also provides a method of assembling an electrical-component assembly. The method includes providing a first portion of a housing including a slot having a threaded portion and providing a switch having a threaded portion. The threaded portion defines a longitudinal thread axis. The method also includes orienting the switch relative to the first portion of the housing and moving the switch relative to the first portion of the housing along a path that is not parallel to the thread axis. The method further includes engaging the threaded portion of the switch with the slot without substantial rotation of the switch about the thread axis.

Other aspects and embodiments of the invention will become apparent by consideration of the detailed description and accompanying drawings.

BRIEF DESCRIPTION OF THE DRAWING

The detailed description particularly refers to the accompanying figures in which.

DETAILED DESCRIPTION

Before any embodiments of the invention are explained in detail, it is to be understood that the invention is not limited in its application to the details of construction and the arrangement of components set forth in the following description or illustrated in the following figures. The invention is capable of other embodiments and of being practiced or of being carried out in various ways. Also, it is to be understood that the phraseology and terminology used herein is for the purpose of description and should not be regarded as limiting. The use of “including,” “comprising,” or “having” and variations thereof herein is meant to encompass the items listed thereafter and equivalents thereof as well as additional items. Unless specified or limited otherwise, the terms “mounted,” “connected,” “supported,” and “coupled” and variations thereof are used broadly and encompass direct and indirect mountings, connections, supports, and couplings. Further, “connected” and “coupled” are not restricted to physical or mechanical connections or couplings.

Figure 1:
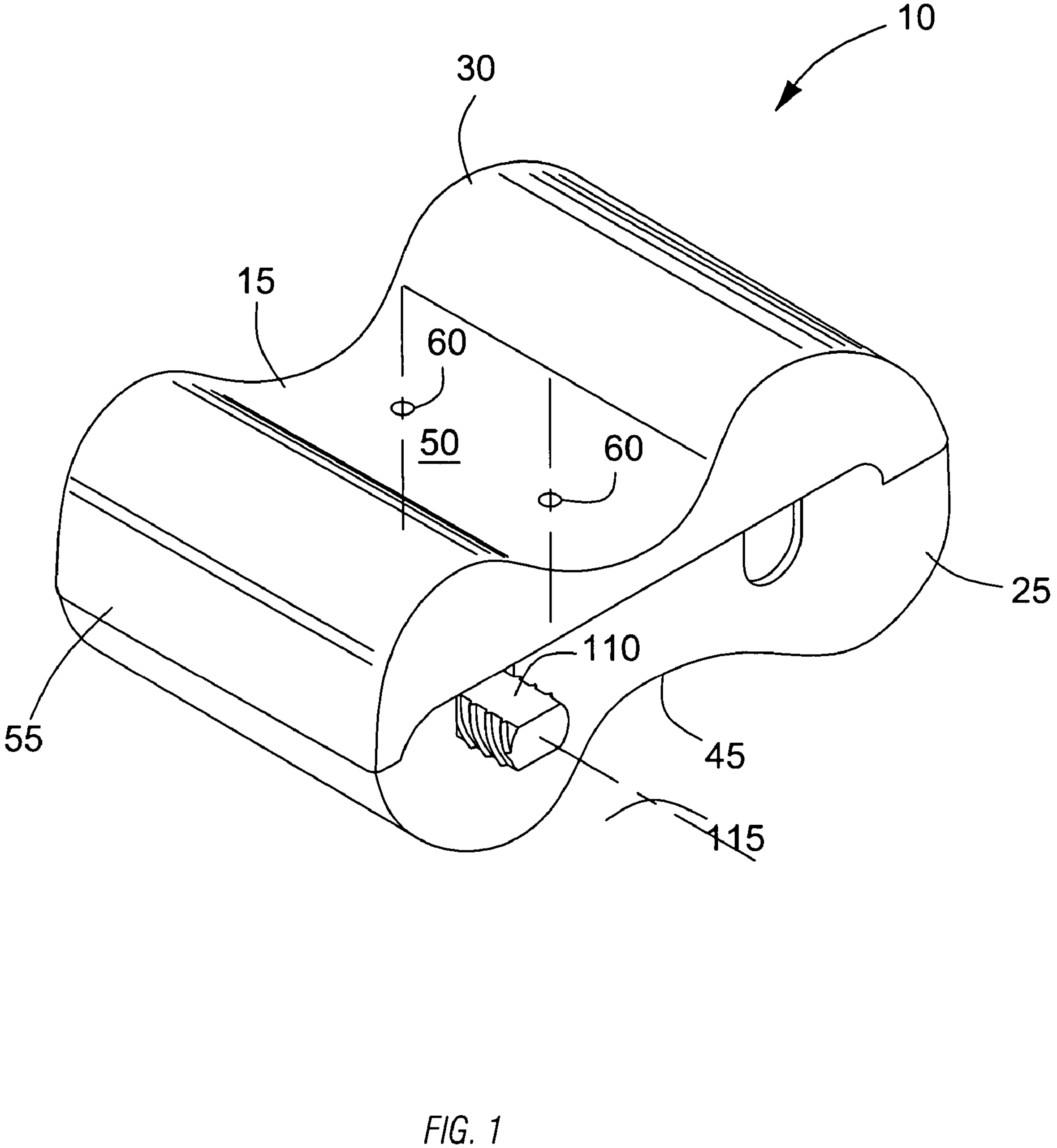
FIG. 1 is perspective view of an electrical-component assembly embodying the invention.
Figure 2:
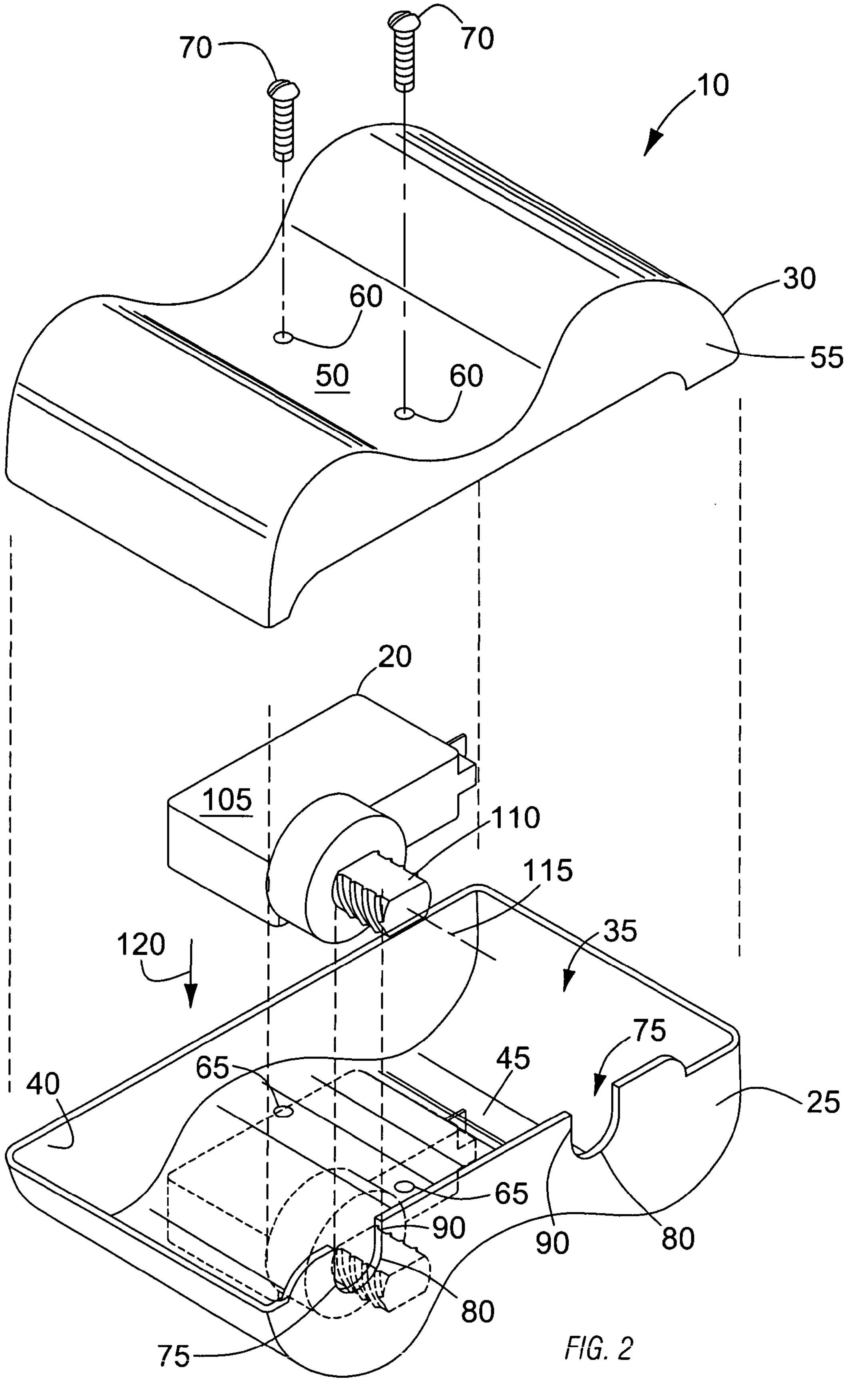
FIG. 2 is an exploded perspective view of the assembly of FIG. 1.

FIG. 1 shows an electrical-component assembly 10 that includes a housing 15 and an electrical component, such as a switch 20 (shown in FIG. 2). In use, the assembly 10 is generally coupled to a motor or other electrical device. For example, in one construction, the assembly 10 attaches to a motor that drives a pump or compressor for a jetted bathtub. In this construction, the switch 20 controls the operation of the motor.

With reference to FIG. 2, the assembly 10 is shown exploded. The housing 15 includes a first portion 25 and a second portion 30 that cooperate to define a housing interior 35. The first housing portion 25 includes one or more walls 40 that extend from and surround a base portion 45 to define a portion of the interior 35. The second portion 30 includes a cover portion 50 and one or more walls 55 that extend from the cover portion 50 and correspond with the walls 40 of the first portion 25. In most constructions, one or more apertures 60 pass through the second portion 30 and align with corresponding threaded apertures 65 in the first portion 25. A fastener 70 extends through each of the apertures 60 in the second portion 30 and engages the threaded aperture 65 of the first portion 25 when the second portion 30 is positioned as desired over the first portion 25. In this way, the fasteners 70 attach the second portion 30 to the first portion 25. Other constructions may employ other means for connecting the first portion 25 and the second portion 30. As such, the invention should not be limited to fasteners 70 alone.

Figure 3:
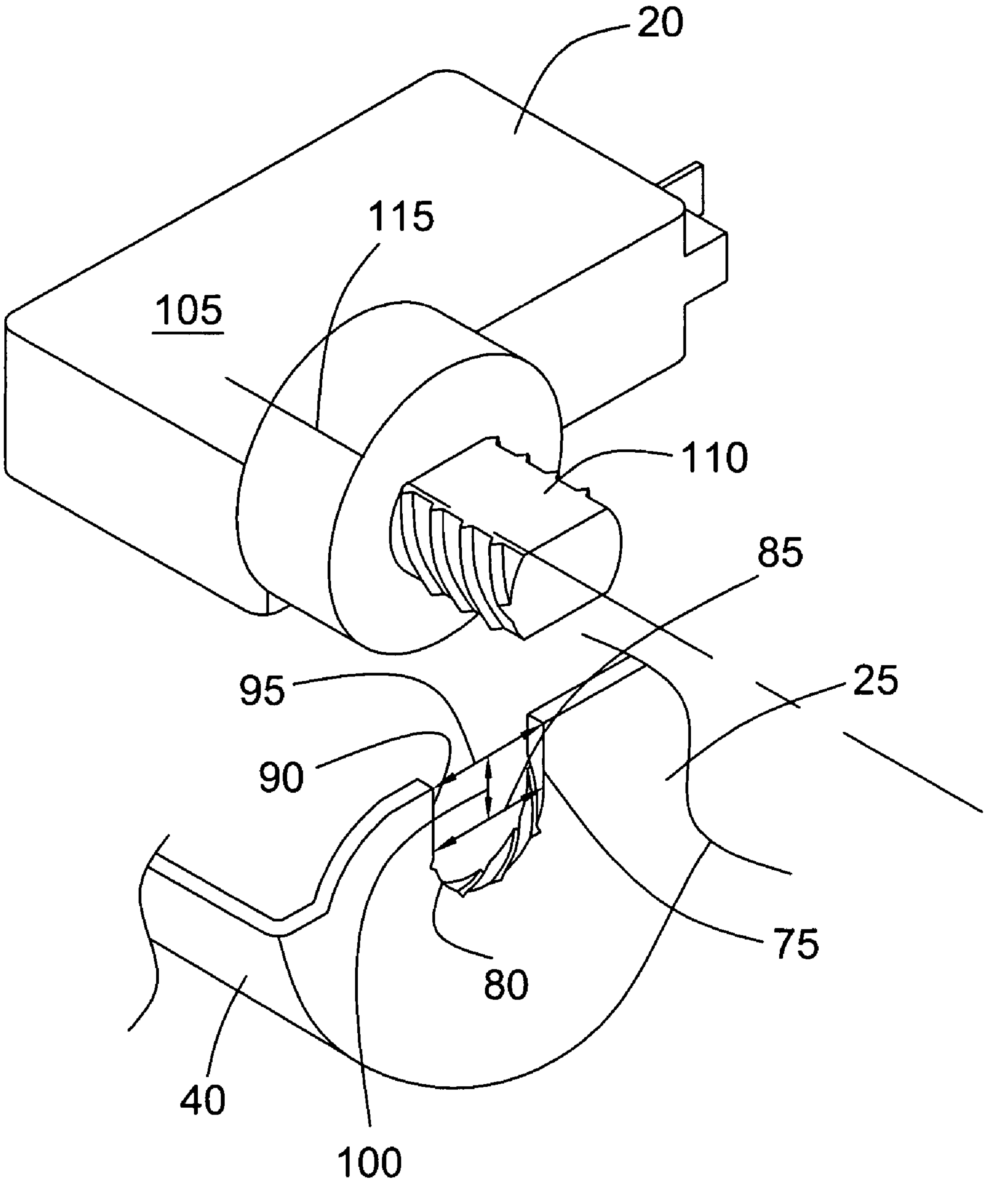
FIG. 3 is an enlarged perspective view of a portion of the assembly of FIG. 1 with the switch shown in an aligned position.

As illustrated in FIG. 3, a substantially U-shaped slot 75 is formed in one of the walls 40 of the housing first portion 25. The U-shaped slot 75 includes a substantially arcuate portion 80. In most constructions, the arcuate portion is defined by a portion of circle and has a diameter 85. The slot 75 also has a substantially rectangular portion 90 that has a width 95 and a height 100. The width 95 of the rectangular portion 90 is generally greater than or equal to the diameter 85 of the arcuate portion 80. The height 100 of the rectangular portion 90, measured from the center of the arcuate portion 80, is preferably at least as great as the radius of the arcuate portion 80. In constructions in which the height 100 is less than the radius, an additional slot may be required in the second portion 30 of the housing 15.

Figure 4:
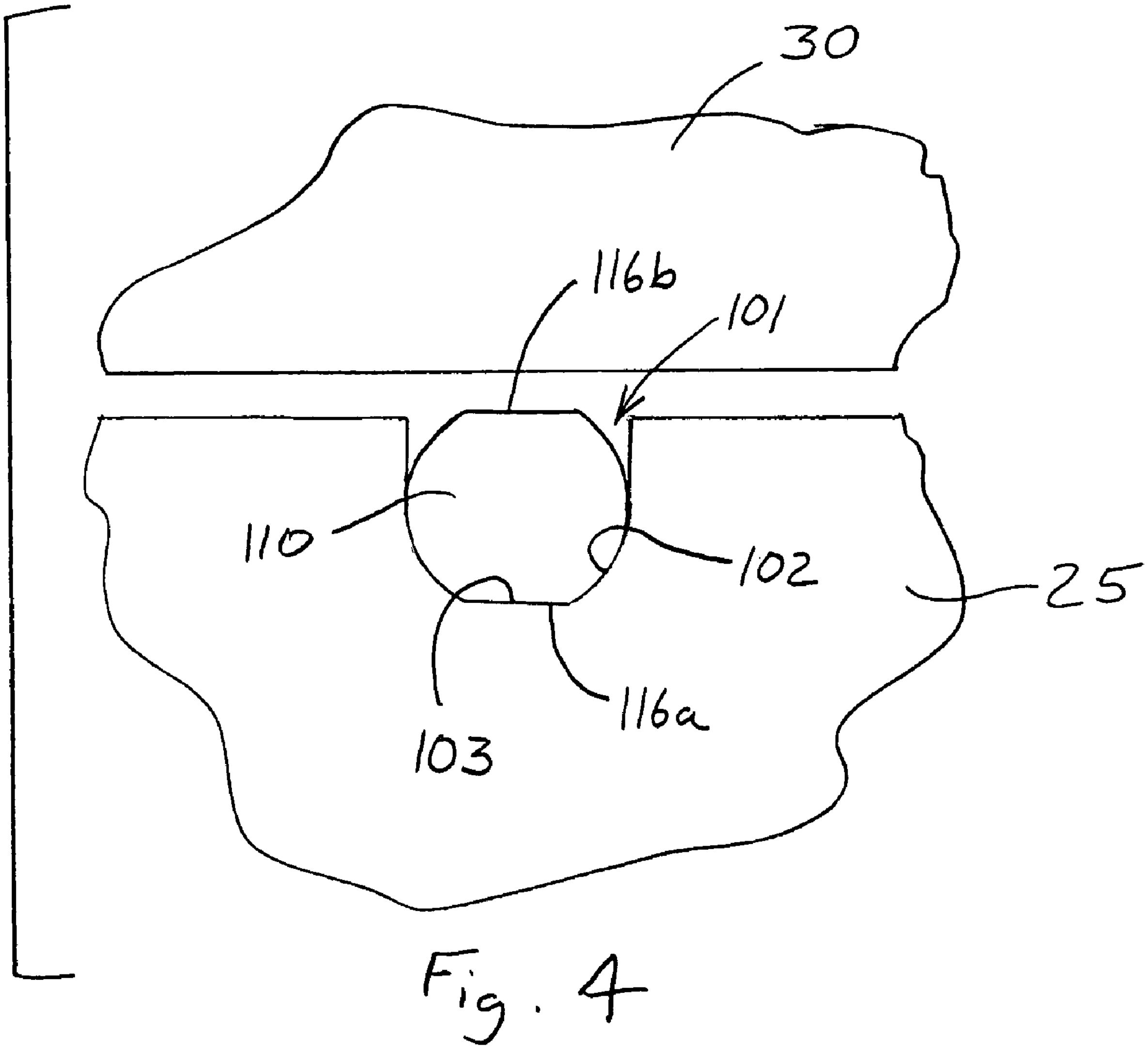
FIG. 4 is an end view of a portion of an electrical-component assembly engaged with a housing.

It should be noted that other constructions may employ other shapes to make up the substantially U-shaped slot. For example, a slot could be formed using a non-circular portion (e.g., ellipse, oval, parabola, etc.) topped by a rectangular or trapezoidal shape. In still other constructions, the entire U-shaped slot could be shaped to substantially match a parabola. In yet another construction, a slot 101 includes a threaded arcuate portion 102 that includes a flat surface 103 as illustrated in FIG. 4. As such, the invention should not be limited to a U-shaped slot 75 made up of an arcuate portion 80 that is substantially circular and a rectangular portion 90.

The arcuate portion 80 is threaded to facilitate the engagement of the switch 20 and the housing 15. In some constructions, the rectangular portion 90 or a portion of the rectangular portion 90 is also threaded. The threads can be tapped, or machined into the housing 15 if desired. Alternatively, the threads are formed as part of the first portion 25 when the first portion 25 is formed. For example, in one construction, the first portion 25, including the threads, is injection molded from a thermosetting material in a single operation. In another construction, a cast metal first portion 25, including the threads, is formed in a single casting operation. Forming the threads as part of the first portion 25 reduces the cost of manufacturing the assembly 10 by eliminating the need for a threading operation.

The switch 20 includes a body portion 105 and a protrusion such as a stem portion 110 that extends from the body portion 105. The body portion 105 contains at least part of the mechanical and electrical components that allow the switch 20 to function. As such, the body portion 105 is generally disposed within the housing interior 35. Positioning the body 105 within the housing 15 allows the housing 15 to provide some measure of protection to the switch 20. In some constructions, portions of the mechanical and electrical components can be positioned within the stem portion 110. For example, a sensor could extend through the stem portion 110, or wires could pass through the stem portion 110 if desired.

The stem portion 110 serves, among other things, as an attachment point for the switch 20. Thus, the stem 110 allows the switch 20 to be fixed to a component such as the housing 15. As illustrated in FIG. 2, the protrusion, in the form of the stem portion 110 is a truncated substantially cylindrical extension that is at least partially threaded, with other shaped protrusions also being possible. The stem 110 defines a longitudinal thread axis 115 that extends along the centerline of the stem 110 and two flat surfaces 116*a* and 116*b*. The threads can be formed by cutting (i.e., with a dye), machining, rolling, or formed in any other convenient manner. The threads are formed to match (e.g., pitch, thread type, etc.) the threads formed in the U-shaped slot 75 such that the two components 20, 25 can be engaged.

The stem 110 engages the U-shaped slot 75 to couple the switch 20 to the housing 15. However, as shown in FIGS. 2 and 3, the switch 20 cannot be rotated into position as would be done when threading a conventional threaded shaft into a threaded hole. The switch body 105 is generally too large to rotate within the housing 15. As such, the stem 110 is translated into position. In other words, the stem 110 moves along a path 120 (shown in FIG. 2) that includes a portion that is substantially orthogonal to the thread axis 115 to engage the U-shaped slot 75. Once the stem 110 is in the U-shaped slot 75, it may need to be rotated slightly (e.g., less than one-quarter turn) or translated slightly along the thread axis 115 (e.g., less than one-quarter the thread pitch) to engage the threads of the stem 110 with the threads of the U-shaped slot 75. Once the threads are engaged, the switch 20 cannot be moved axially along the thread axis 115, and the switch 20 cannot be rotated significantly, as the first portion 25 of the housing 15 interferes with the free rotation of the switch body 105.

The second housing portion 30 covers the open end of the slot 75 to inhibit movement of the switch 20 out of the U-shaped slot 75. For constructions that include a slot 75 with a rectangular portion 90 having a height 100 equal to the radius of the arcuate portion 80, the second portion 30 may touch, or nearly touch, the stem 110 and hold it in place. In constructions in which the height 100 is greater than the radius, the stem 110 will have additional freedom of movement along the path 120 orthogonal to the thread axis 115. In constructions in which the height 100 is less than the radius, the second portion 30 may require an additional slot or recess to allow clearance for the stem 110.

As discussed above, and illustrated in FIG. 4, some constructions include a slot 101 that has a flat bottom surface 103 disposed at the bottom of the arcuate portion 102. The lowermost flat surface 116*a* engages the flat bottom surface 103 of the slot 101 and the uppermost flat surface 116*b* engages the second housing portion 30. The flat bottom surface 103 increases the surface area that supports the stem 110. In addition, the depth of the slot 101 and the width of the stem 110 as measured from the flat surface 116*a* to the flat surface 116*b* can be accurately controlled to improve the fit between the stem 110 and the housing.

In some constructions, a resilient member (not shown) may be positioned between the switch 20 and the second portion 30 or the slot 80. The resilient member would allow the second portion 30 to firmly hold the switch 20 within the slot 75. In addition, the resilient member would be able to deform to accommodate variations in the slot height 100 and switch 20 that may otherwise make assembly difficult, or result in excess clearance between the switch 20 and the second portion 30.

To assemble the switch 20 and housing 15, the U-shaped slot 75 is first formed in the first portion 25 and threaded. The switch 20 is also threaded with threads that match the threads formed in the first portion 25. The switch 20 is aligned in its desired operating position relative to the first portion 25 and then translated into its final operating position. During the translation, the alignment of the switch 20 relative to the first portion 25 remains substantially fixed. The second portion 30 is positioned adjacent the first portion 25 and the fasteners 70 are tightened to attach the first and second portions 25, 30. Once the second portion 30 is attached to the first portion 25, the switch 20 is trapped in its operating position. Thus, the switch 20 is attached to the housing 15 without the use of a common fastener, such as a screw or nut.

Thus, the invention provides, among other things, a new and useful system and method for assembling a switch 20 into a housing 15. The constructions of the switch 20 and housing 15 and the methods of assembling the switch 20 and housing 15 described above and illustrated in the figures are presented by way of example only and are not intended as a limitation upon the concepts and principles of the invention. Various features and advantages of the invention are set forth in the following claims.

The invention claimed is:

1. An electrical-component assembly comprising:

a first housing portion including a wall, the wall including a slot having an open end, an engagement portion, and a non-engagement portion, the engagement portion including threads; and an electrical component including a body and a threaded protrusion, the threaded protrusion defining a longitudinal axis and engaged with the engagement portion of the slot such that the body inhibits rotation of the electrical component about the longitudinal axis relative to the first housing portion, wherein the longitudinal axis does not pass through the open end.

2. An electrical-component assembly as set forth in claim 1 wherein the electrical component is translational along a path that includes a portion that is substantially perpendicular to the longitudinal axis.

3. An electrical-component assembly as set forth in claim 1 wherein the electrical component is a switch.

4. An electrical-component assembly as set forth in claim 3 wherein the switch is an air switch.

5. An electrical-component assembly comprising:

a first housing portion including a wall, the wall including a slot having an open end, an engagement portion, and a non-engagement portion, the engagement portion including threads;

an electrical component including a body and a threaded protrusion, the threaded protrusion defining a longitudinal axis and engaged with the engagement portion of the slot such that the body inhibits rotation of the electrical component about the longitudinal axis relative to the first housing portion; and a second housing portion engaged with the first housing portion to define a housing interior, the second housing portion covering the open end of the slot.

6. An electrical-component assembly as set forth in claim 5 wherein the first housing portion and the second housing portion cooperate to retain the electrical component within the housing interior.

7. An electrical-component assembly as set forth in claim 5 wherein the first housing portion, the second housing portion, and the threaded protrusion cooperate to fully retain the electrical component within the housing interior.

8. An electrical-component assembly as set forth in claim 5 wherein the body is disposed within the housing interior.

9. An electrical-component assembly comprising:

a first housing portion including a wall, the wall including a threaded slot having an open end;

a second housing portion engaged with the first housing portion to define a housing interior, the second housing portion covering the open end;

a switch disposed substantially within the housing interior and including a body and a threaded protrusion, the threaded protrusion translationally engaged with the threaded slot such that the body inhibits rotation of the switch relative to the first housing portion.

10. An electrical-component assembly as set forth in claim 9 wherein the body is disposed within the housing interior.

11. An electrical-component assembly as set forth in claim 9 wherein the threaded protrusion defines a longitudinal thread axis and wherein the switch is movable into the slot only along a path that is substantially perpendicular to the thread axis.

12. An electrical-component assembly as set forth in claim 9 wherein the switch is an air switch.

13. An electrical-component assembly as set forth in claim 9 wherein the first housing portion and the second housing portion cooperate to retain the switch within the housing interior.

14. An electrical-component assembly as set forth in claim 9 wherein the first housing portion and the second housing portion are the sole restraints for retaining the switch within the housing interior.

15. A method of assembling an electrical-component assembly, the method comprising:

providing a first portion of a housing including a slot having a threaded portion;

providing a switch having a threaded portion, the threaded portion of the switch defining a longitudinal thread axis;

orienting the switch relative to the first portion of the housing;

moving the switch relative to the first portion of the housing along a path that is not parallel to the thread axis; and engaging the threaded portion of the switch with the threaded portion of the slot without substantial rotation of the switch about the thread axis.

16. A method as set forth in claim 15 wherein the path is substantially perpendicular to the thread axis.

17. A method as set forth in claim 15 wherein the moving step further comprises substantially maintaining the orientation of the switch relative to the first portion of the housing.

18. A method as set forth in claim 15 further comprising positioning a second portion of the housing adjacent the first portion of the housing to define a housing interior and positioning a substantial portion of the switch within the housing interior.

19. A method as set forth in claim 18 wherein the second portion covers an open end of the slot to inhibit translational movement of the switch perpendicular to the thread axis.

20. A method as set forth in claim 18 wherein the first portion of the housing, the second portion of the housing, and the switch treaded portion cooperate to fully restrain the switch.

* * * * *